July 28, 1959 B. WALKER 2,896,938
VEHICLE SUSPENSION DEVICE
Original Filed May 6, 1954
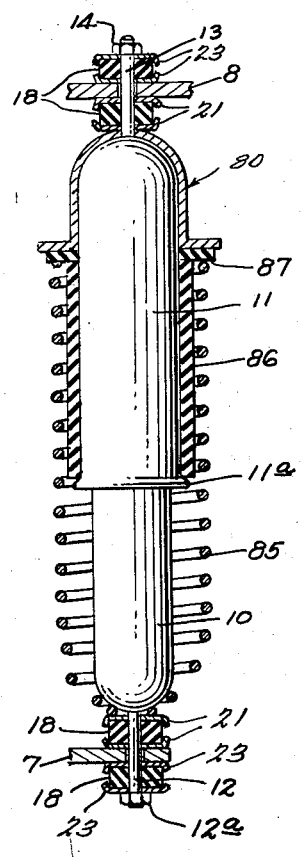
INVENTOR.
Brooks Walker – # United States Patent Office 2,896,938
Patented July 28, 1959

2,896,938
VEHICLE SUSPENSION DEVICE

Brooks Walker, Piedmont, Calif., assignor to Monroe Auto Equipment Company, Monroe, Mich., a corporation of Michigan Original application May 6, 1954, Serial No. 427,927. Divided and this application October 10, 1958, Serial No. 769,967

4 Claims. (Cl. 267—8)

This invention pertains to improvements in overload springs, shock absorbers, and the like. This application is a division of application Serial No. 427,927, filed May 6, 1954, now U.S. Patent No. 2,889,144.

A feature of this invention is to provide an adapter that can be readily applied to shock absorbers of the telescoping type, as used on many of the automobiles as currently manufactured in the United States, without the necessity of modifying the shock absorbers or their mountings. Most present shock absorbers have bolt or eye ends, and the adapters shown in this invention fit either the bolt or eye end and are secured to the shock absorber in alignment therewith by one model of adapter nesting around the body of the shock absorber at one end and another model adapter nests around the rock guard at the other end of the shock absorber. Where shock absorbers have eye ends the adapters are constructed to pass over the eyes, turn ninety degrees or a part revolution, and be capable of then taking a heavy spring load by the spring on the outside of the shock absorber which butts against the adapters at each end of the shock absorber. The spring contact may be quieted by a resilient rubberlike washer over the adapter spring receiving flange of the adapter. By cone ending one end of the spring to fit the bolt end, only one adapter will be necessary. Other objects of the invention will be more particularly pointed out in the accompanying specifications and claims.

I have illustrated my invention by way of example in the accompanying drawing.

The drawing is an elevation view of a device embodying the principles of the invention.

Referring now to the drawing, it will be seen that the device of this invention includes a shock absorber which may be of any satisfactory telescopic type, but which is illustrated as being of a conventional hydraulic direct-acting type having an elongated body portion 10 and a piston and piston rod (not shown) movable relative to the body portion 10 in a conventional manner. A rock guard or shield 11 is connected with the shock absorber piston rod and extends downwardly over a portion of a shock absorber body portion 10 in concentric spaced relationship thereto so that upon compression and extension of the shock absorber, the rock guard 11 will move toward and away from the lower end of the shock absorber body portion 10. Bolt or stud extensions 12 and 13 are provided at opposite ends of the shock absorber for mounting the same between sprung and unsprung assemblies of, for example, a vehicle. The bolt extension 12 is connected to the bottom of the shock absorber body portion 10 and the bolt extension 13 may be either an extension of the shock absorber piston rod or may be connected to the rock guard 11 which in turn is connected to the shock absorber piston rod. Rubbers 18 are mounted on the shock absorber extensions 12 and 13 and are nestled between centering washers 21 and retaining washers 23, on both sides of a supporting bracket 8, at the top of the shock absorber, which is usually attached to a vehicle frame or chassis, and on both sides of a supporting bracket 7, at the lower end of the shock absorber, which is usually attached to the vehicle axle or wheel supporting structure.

The top adapter 80 fits the dust or rock guard 11 at the top of the shock absorber and fits over bolt 13 of shock absorber 10 and is retained by nut 14 and rubbers 18. Spring 85 is coned in at the bottom to fit bolt 12 and be located between the bottom of shock body 10 and rubber 18. A sleeve 86 of non-metallic rubber or fibre material fits between adapter 80 and the flange 11a of the dust guard 11. A rubber-like non-metallic washer 87 is preferably inserted between the upper end of spring 85 and adapter 80. When the operator desires to remove the overload spring, it is only necessary to remove nut 12a, remove the rubber 18, spring 85, and replace the shock absorber for normal car springing. By using adapters that shorten the overload spring, such as 85, the spring diameter to length ratio is kept better for a more stable spring.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A shock absorber of the telescoping type, a coil spring, ends on said shock absorber for attaching said shock absorber to parts of a vehicle, said shock absorber having a body portion, said ends being smaller in diameter than said body portion, said coil spring adapted to surround said shock absorber and support a load by forcing said ends of said shock absorber apart, one end of said spring having coils of smaller coil diameter than said body, said smaller coils bearing on said one of said shock absorber ends and on said attached vehicle parts to transmit forces directly to said vehicle parts without going through said shock absorber body portion adjacent said coils of smaller diameter than said body portion.

2. In a suspension device, a hydraulic direct-acting tubular shock absorber having relatively movable telescopic parts, a coil spring disposed substantially concentrically with respect to said shock absorber, means on one of said relatively movable shock absorber parts engaging and supporting one end of said coil spring, means on the other of said relatively movable shock absorber parts engaging and supporting the opposite end of said coil spring, and an elongated nonmetallic resilient tubular spacer sleeve fitted over said shock absorber and resisting lateral movement of said coil spring so that the coil spring is maintained in substantially concentric relationship with respect to said shock absorber.

3. In a suspension device, a hydraulic direct-acting tubular shock absorber having relatively movable telescopic parts, a coil spring sleeved over said shock absorber, the inside diameter of said spring being larger than the outside diameter of said shock absorber, an elongated nonmetallic tubular spacer sleeve fitted over said shock absorber and disposed in the space between said shock absorber and said coil spring, said spacer sleeve resisting lateral movement of the coil spring so that said shock absorber and coil spring are maintained in spaced substantially concentric relationship.

4. In a suspension device, a hydraulic direct-acting tubular shock absorber including relatively movable telescopic parts, one of said parts including an elongated body member and the other of said parts including a rock guard disposed exteriorly of and in concentric relation with said body member, a coil spring disposed substantially concentrically around said shock absorber, means on one of said relatively movable shock absorber parts engaging and supporting one end of said coil spring, means on the other of said relatively movable shock absorber parts engaging and supporting the opposite end of said coil spring, and an elongated nonmetallic tubular spacer sleeve fitted over said shock absorber rock guard and resisting lateral movement of said coil spring so that said coil spring is maintained in substantially concentric relationship with respect to said shock absorber.

References Cited in the file of this patent

UNITED STATES PATENTS

| | | |
|---|---|---|
| 2,321,832 | Leighton | June 15, 1943 |
| 2,621,919 | Utz | Dec. 16, 1952 |
| 2,624,592 | MacPherson | Jan. 6, 1953 |
| 2,806,713 | Muller | Sept. 17, 1957 |

FOREIGN PATENTS

| | | |
|---|---|---|
| 565,630 | Great Britain | Nov. 20, 1944 |